United States Patent [19]

Hughes

[11] 4,212,611
[45] Jul. 15, 1980

[54] APPARATUS FOR FORMING INDIVIDUAL SERVING PORTIONS OF A FROZEN DAIRY CONFECTION

[76] Inventor: Max B. Hughes, Rte. A, Clear Lake Riviera, Lower Lake, Calif. 95457

[21] Appl. No.: 962,364

[22] Filed: Nov. 20, 1978

[51] Int. Cl.$^2$ ................................................. A23P 1/00
[52] U.S. Cl. ..................................... 425/114; 83/171; 83/437; 425/126 S
[58] Field of Search ...................... 83/171, 651.1, 437, 83/431; 29/33 K; 425/126 S, 113, 114; 99/430

[56] References Cited
U.S. PATENT DOCUMENTS

| | | | |
|---|---|---|---|
| 701,874 | 6/1902 | Glaus | 83/437 |
| 1,343,932 | 6/1920 | Raia | 83/171 |
| 1,455,988 | 5/1923 | Bracken | 83/437 X |
| 1,601,374 | 9/1926 | Reichel | 83/437 X |
| 2,120,375 | 6/1938 | Shaver et al. | 83/437 |
| 2,232,196 | 2/1941 | Anderson | 425/126 S |
| 2,345,678 | 4/1944 | Lamar | 83/171 |
| 2,859,714 | 11/1958 | Cummings et al. | 425/126 S |
| 3,822,623 | 7/1974 | Wight | 83/171 |
| 3,830,123 | 8/1974 | Wilgus | 83/171 |

*Primary Examiner*—William R. Briggs
*Attorney, Agent, or Firm*—Townsend and Townsend

[57] ABSTRACT

An apparatus for forming individual serving portions of a frozen dairy confection from a block of the confection. A frame having a plurality of interconnected electrically conductive wires stretched across its sides serves as a die. The wires define a plurality of apertures. An electric power supply provides current to the wires and the electrical resistance of the wires heats the wires. Means are provided for moving a block of the frozen confection through the apertures so that the heated wires cut the block into the individual serving portions.

12 Claims, 5 Drawing Figures

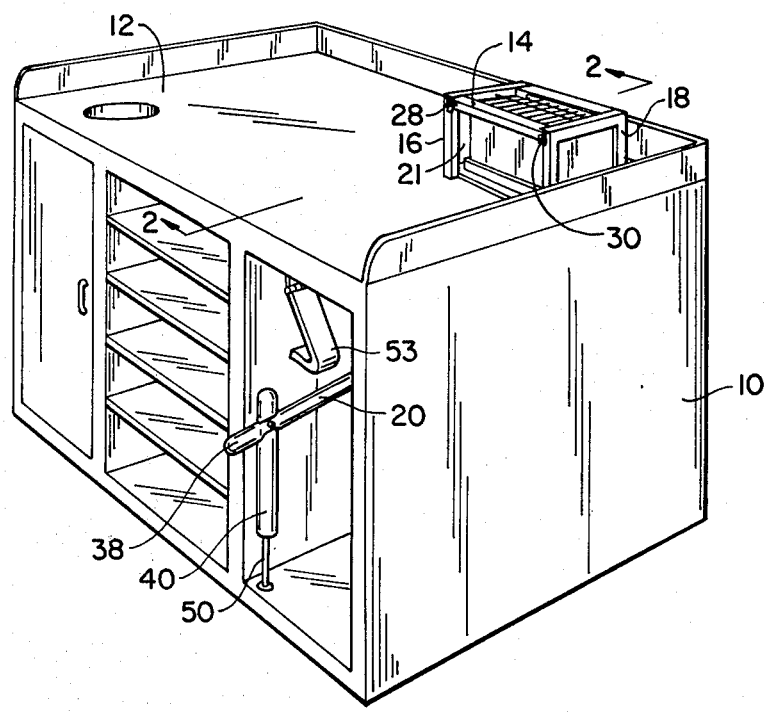
FIG._1.
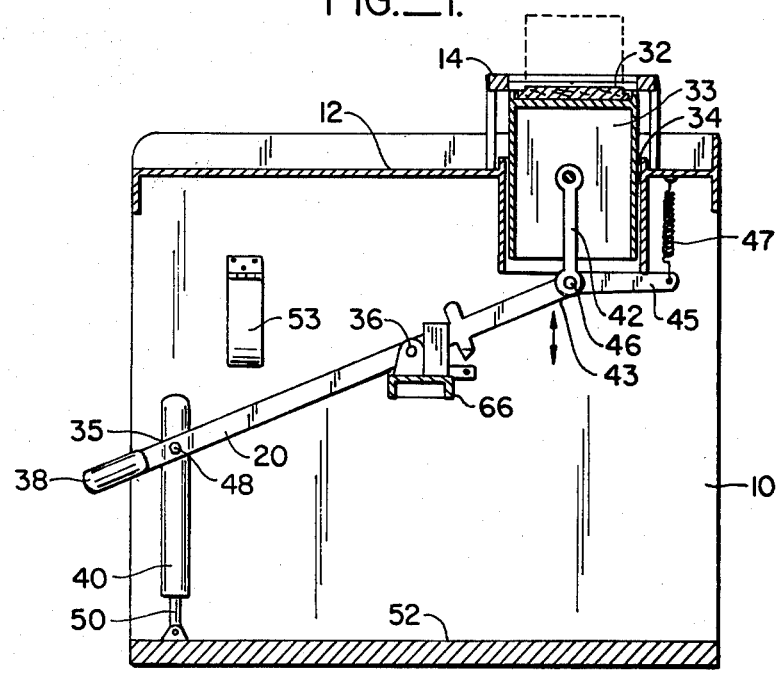
FIG._2.

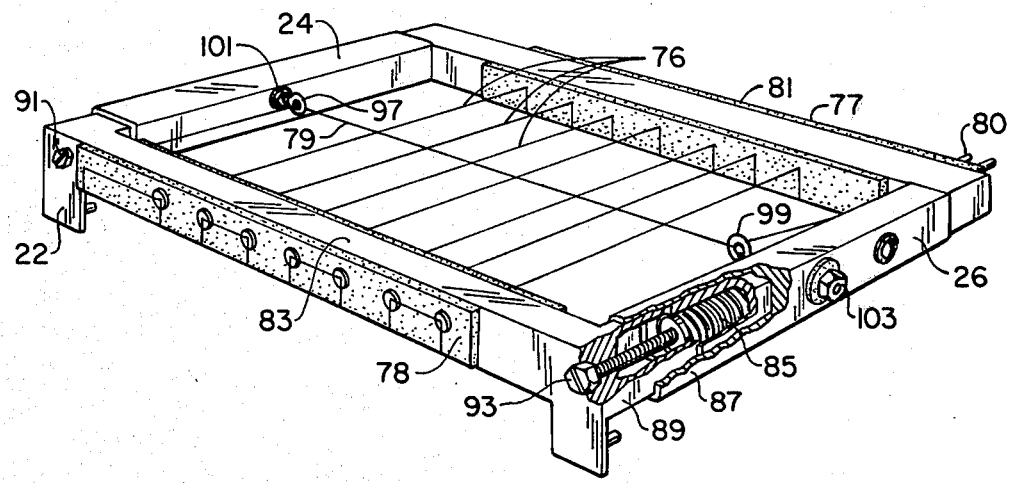
FIG._3.
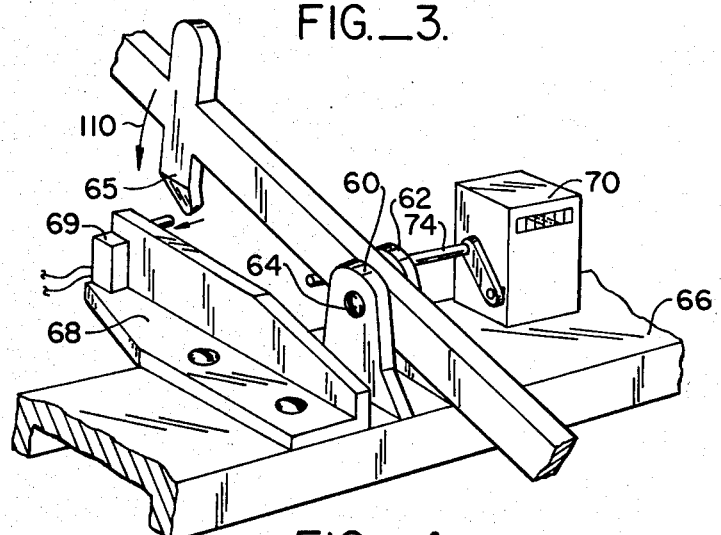
FIG._4.

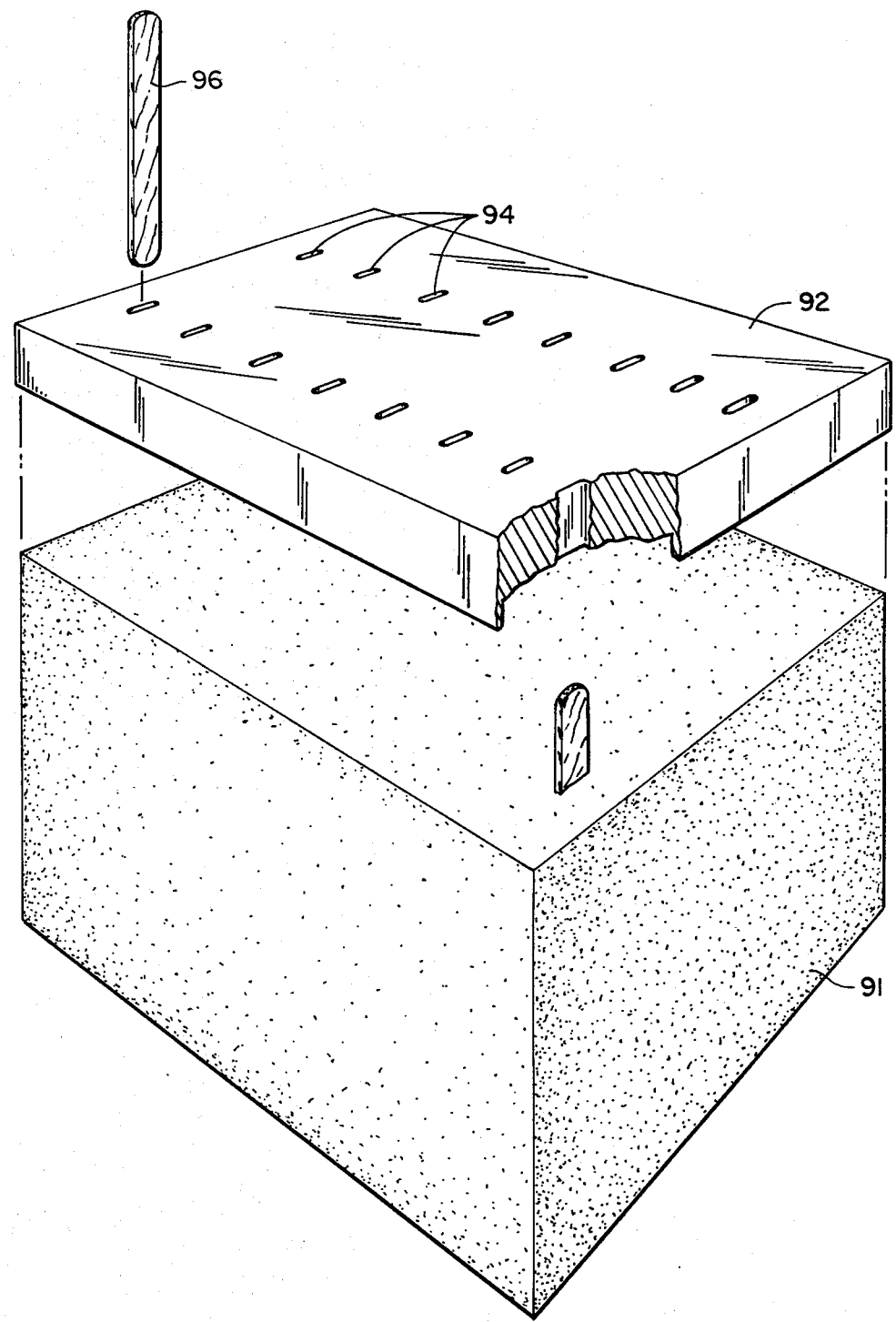
FIG._5.

APPARATUS FOR FORMING INDIVIDUAL SERVING PORTIONS OF A FROZEN DAIRY CONFECTION

BACKGROUND OF THE INVENTION

This invention relates to an apparatus for forming individual serving portions of a frozen dairy confection, such as ice cream or frozen yogurt.

Conventionally, individual ice cream serving portions, which are generally individually wrapped, and may use a wooden stick to facilitate holding the serving portion, are formed at an ice cream plant. The portions are formed, each from its own mold, wrapped directly at the ice cream plant, and subsequently distributed to food stores and ice cream retail outlets. Because of the need for a central manufacturing plant and the time required for distribution to retail outlets, the end product may lack desired freshness and appeal to the consumer.

Additionally, since the product must be kept frozen, the cost of distribution and storage prior to sale to the consumer can be prohibitive for retail outlets which are not located close to the ice cream plant. Accordingly, expansion in the number of ice cream outlets for the retail sale of individual ice cream serving portions is substantially limited since each outlet must be located in relatively close proximity to the central manufacturing plant.

SUMMARY OF THE INVENTION

Broadly, the present invention provides an apparatus for forming individual serving portions from a conventional and readily available block of frozen dairy confection, thus enabling the apparatus to be installed in locations remote from the central manufacturing plant, such as in "fast food" stores.

The invention comprises generally a fixed die defining a plurality of apertures, and means for moving a block of ice cream through the die so as to form the individual serving portions. Typically, the block of ice cream is a conventional size, such as a half-gallon block, which is readily available at numerous wholesale and retail outlets.

The die through which the block of ice cream is moved comprises generally a rectangularly shaped frame slightly greater in area than the largest surface of the block, and a plurality of electrically conductive wires stretched across the frame which define a plurality of apertures. Means are provided for supplying electric current to the wires to heat them, which thereby facilitates the movement of the block through the die and the cutting of the block into the individual serving portions.

The means for moving the block through the above-described die comprises essentially a plate for supporting the block beneath the die, a lever arm mounted for rotation about a horizontal axis between its ends and operatively connected near one end to the plate, and means for rotating the lever arm about its rotational axis so as to move the block through the apertures defined by the heated wires of the die.

The die and block moving means are typically built into a stainless steel storage cabinet having a horizontal upper counter surface providing a convenient work space. The die is raised above the counter surface and is supported therefrom in a substantially horizontal plane parallel to the counter surface. Vertically aligned beneath the die is an opening in the counter surface for the movement of the plate on which the block of ice cream is supported. The plate is adapted for vertical movement and when oriented within the opening in the counter surface so as to be generally co-planar with the counter surface, the block may be inserted between the die and the plate and placed on the plate. The lever arm connected at one end to the plate is rotatably mounted to the cabinet between its ends and has its other end located below the counter surface and extending out of the cabinet for manual access. This end has a handle attached and is connected to the bottom of the cabinet by a vertically oriented pneumatic arrestor, such as those used on doors to prevent their sudden closure. The end of the lever arm near the plate is connected to the counter surface by a vertically oriented tension spring.

In operation, the handle of the lever arm is raised upward, thereby causing extension of the pneumatic arrestor, rotation of the lever arm about its rotational axis, extension of the tension spring, and downward movement of the plate. When the plate has been moved downward so as to reside within the opening in the counter surface and be generally co-planar with the counter surface, the lever arm is secured in this position by a releasable latch. The block of ice cream or frozen yogurt, which is typically a readily available half-gallon size block, is inserted from the counter surface between the die and the plate and placed on the plate. The latch is then released and the previously extended tension spring pulls the plate upward, thereby rotating the lever arm and moving the block of ice cream supported on the plate upward through the die. The extended pneumatic arrestor restrains the sudden rotation of the lever arm caused by the tension spring and permits the block to move through the die at a relatively constant velocity. The electric current passing through the wires stretched across the rectangularly shaped frame of the die heats the wires and facilitates the cutting of the ice cream block into the individual serving portions.

If it is desired to form stick-held serving portions, a form is provided having a generally planar surface and a plurality of openings therethrough. Prior to the insertion of the block between the die and the supporting plate, the form is placed over the largest surface of the ice cream block. Sticks are placed through the openings in the planar surface and into the block. The form is removed by lifting it upward, leaving a block of ice cream with a number of upwardly extending sticks. The block with the upwardly extending sticks is inserted between the die and the plate and placed on the plate. The openings in the form through which the sticks are inserted are arranged to be vertically aligned generally with the centers of the apertures defined by the wires stretched across the die frame. The formation of the individual stick-held serving portions proceeds as described above with the sticks passing through the centers of the apertures as the block is moved through the die.

As should now be apparent, the present invention permits the formation of individual serving portions of ice cream, ice milk, sherbert, frozen yogurt or any type of frozen dairy confection, which eliminates the necessity of locating the retail outlet in close proximity to an ice cream plant or distribution center. Because the block of ice cream which is cut into the individual portions is readily available, expansion in the number of retail outlets is thus possible. Additionally, the individual serving portions may be formed as needed and in the presence of the consumer, thereby assuring the freshness and appeal of the product and a less expensive product.

For a fuller understanding of the nature and advantages of the invention, reference should be made to the following detailed description taken in conjunction with the accompanying drawings.

BRIEF DESCRIPTION OF THE DRAWINGS

FIG. 1 is a perspective view of the cabinet housing the die and the means for moving the ice cream block through the die.

FIG. 2 is a view of Section 2—2 of FIG. 1 illustrating the means for moving the ice cream block through the die.

FIG. 3 is a perspective view of the die illustrating a portion of the die frame in cut-away.

FIG. 4 is an isometric view of the electrical switch and the counter operatively connected to the lever arm.

FIG. 5 is a view of the form for placing sticks through the ice cream block prior to the formation of individual stick-held portions.

DESCRIPTION OF THE PREFERRED EMBODIMENTS

Referring first to FIG. 1, a cabinet 10 having a substantially horizontal upper counter surface 12 supports in a fixed position above the counter surface a die 14, and houses beneath the counter surface means, including lever arm 20, for moving a block of ice cream, or any other type of frozen dairy confection, such as sherbert or yogurt, upward through die 14.

Die 14 is supported above counter surface 12 of cabinet 10 and fixed in a substantially horizontal plane by means of spaced apart vertical supports 16, 18. Spaced apart vertical supports 16, 18, together with horizontally oriented die 14 supported near the upper ends of vertical supports 16, 18, define a passage 21 which allows the insertion of a block of ice cream from counter surface 12. As illustrated FIGS. 1 and 3, die 14 includes a rectangular frame 22 which has opposite sides 24, 26 adapted for insertion into slots 28, 30 at the upper ends of vertical supports 16, 18, respectively. The provision for slots 28, 30 on vertical supports 16, 18 permit the die 14 to be inserted therein when in use and removed for cleaning when not in use.

Referring now to FIG. 2, the means for moving the block upward through die 14 is illustrated. A horizontal plate 32 is movable through an opening 34 in counter surface 12. Opening 34 is rectangularly shaped and located beneath die 14 and between spaced apart vertical supports 16, 18. Lever arm 20 mounted for rotation about a substantially horizontal axis defined by pin 36 is operatively connected near one end 43 to plate 32 in the manner more fully described below, and at the other end 35, having a handle 38, to a pneumatic arrester 40.

Plate 32 is the upper portion of a piston member 33 which is connected to lever arm 20 near an end 43 by a rod 42. Plate 32 is constructed of electrically non-conductive material and has a plurality of grooves (not shown) on its upper surface. An extension 45 of lever arm 20 extends substantially horizontally outward from end 43. A vertically oriented tension spring 47 interconnects the outer extent of extension 45 and the underside of counter surface 12. The end 35 of lever arm 20 is connected by pin 48 to vertically oriented conventional pneumatic arrester 40. The shaft 50 of pneumatic arrester 40 is secured at its end to the base 52 of cabinet 10. Thus as handle 38 of lever arm 20 is lifted upward, pneumatic arrester 40 is moved upward, thereby extending shaft 50. A latch 53 mounted for hinged movement to a wall in cabinet 10 supports end 35 of lever arm 20 in an upper position.

Referring now to FIG. 4, the particular structure for rotatably supporting lever arm 20 about a horizontal axis between its ends is illustrated. Lever arm 20 is supported between vertical brackets 60, 62 and a pin 64 inserted through bracket 60, lever arm 20, and bracket 62 allows rotational movement of lever arm 20 about an axis defined by pin 64. Brackets 60, 62 are secured to a horizontally oriented shelf 66 located within cabinet 10 and secured thereto.

An extension 65 located on lever arm 20 lies within the plane of movement of lever arm 20 and extends perpendicularly outward from both sides of lever arm 20. Supported on shelf 64 and extending outward and generally parallel to the vertical plane defined by rotational movement of lever arm 20 is a bracket 68 having an electrical switch 69 thereon for contact by extension 65 of lever arm 20. Electrical switch 69 is contacted by extension 65 to open and close an electrical circuit, the function of which will be more fully described below.

Also located on shelf 64 is a counter 70, such as a conventional mechanical counter, having an arm 74 extending generally parallel to pin 64 and beneath lever arm 20 for contact by lever arm 20.

Referring now to FIG. 3, die 14 which serves to cut the block of ice cream into the individual serving portions is illustrated. Die 14 comprises generally an adjustable rectangular frame 22 and a plurality of interconnected electrically conductive wires, such as wires 76 and wire 79 stretched across the sides of rectangular frame 22. On the outside of opposite sides 81, 83 of frame 22 are insulative sheets 77, 78 which separate frame sides 81, 83 from contact with wires 76. An electrical connector 80 extends outward from frame 22 and is adapted for connection to an electrical power supply (not shown). The electrically conductive wires 76, 79 are preferably one continuous wire connected to electrical connector 80 to form an electrical circuit. In the preferred embodiment this single wire consists of seven wires 76 stretched across opposite sides 81, 83 and one wire 79 stretched across opposite sides 24, 26 to thereby define sixteen rectangularly shaped apertures. Wire 79 lies above the plane defined by wires 76 and does not contact any of wires 76. The electrical switch 69 (FIG. 4) is interconnected between electrical connector 80 and the power supply (not shown) to either permit or inhibit the passage of current from the power supply to the electrical wires of die 14.

As illustrated in FIG. 3, frame 22 includes means for adjusting the separation of sides 81, 83 so as to tighten the wires 76 stretched therebetween. Frame 22 comprises two halves 87, 89 connected together at sides 24, 26. Frame half 87 has ends which telescope into the ends of frame half 89. Bolts 91, 93 are located within ends of frame half 87 and project into the ends of frame half 89. The ends of the bolts, such as bolt 93, are in contact with compressive springs, such as spring 85, located within frame half 87. Thus, referring to FIG. 3, it will be noted that frame halves 87, 89 are forced apart from one another by compressive springs, such as spring 85, thereby placing the wires 76 stretched across opposite sides 81, 83 in constant tension. Thus despite the expansion of wires 76 due to heating, the springs between frame halves 87, 89 push the frame halves apart to maintain tension in wires 76. The tightness of wires 76 may be increased or decreased by tightening or loosening, respectively, the bolts, such as bolt 93, contacting the compressive springs, such as spring 85. Wire 79 stretched across sides 24, 26 is connected to eyelets 97, 99 on respective bolts 101, 103 to thereby permit its tightening or loosening.

While in the preferred embodiment, the wires 76 stretched between sides 81, 83 and wire 79 stretched between sides 24, 26 are oriented to define a plurality of rectangularly shaped apertures, it should be apparent that various shapes and sizes of apertures may be formed by altering the direction and number of wires on the frame.

Referring now to FIG. 5, a conventional block of ice cream, which is preferably a readily available half gallon size, is illustrated with a form 92 sized to fit over the largest surface of block 91. A plurality of openings 94 are provided through the planar shaped form 90, and, as may be better understood by referring to FIG. 3, each of the openings 94 in form 92 is vertically aligned with a potential serving portion, that is, generally with the centers of the apertures defined by wires 76, 79. After the form has been placed over the largest surface area of block 91, sticks, such as stick 96, may be placed through openings 94 and into block 91. The form 92 is then removed, leaving a block 91 having a number of upwardly extending sticks projecting therefrom. Each of these sticks is positioned generally in the center of a potential individual serving portion.

The invention may be better understood by considering the function of the above-described component parts during operation.

Handle 38 of lever arm 20 (FIG. 2) is manually raised upward, thereby extending shaft 50 of pneumatic arrester 40, rotating lever arm 20 about pin 36, moving plate 32 downward, and extending tension spring 37. As handle 38 is raised upward, latch 53 is engaged with lever arm 20 to retain end 35 of lever arm 20 in its uppermost position and plate 32 in its lowermost position, i.e. in position generally co-planar with counter surface 12 of cabinet 10.

Referring now to FIG. 4, the movement of lever arm 20 as indicated by arrow 110, i.e. the raising of handle 38, moves extension 65 of lever arm 20 into contact with electrical switch 69 so as to close the circuit between the power supply (not shown) and the electrically conductive interconnected wires 76, 79 on die 14. Switch 69 is a normally open spring-biased switch, such as a conventional microswitch. Thus electric current passes through wires 76, 79 and the resistance to the current heats the wires. Preferrably the wires are constructed of readily available stainless steel welding wire, which permits sufficient electrical resistance for heating and sufficient strength for cutting the block of ice cream.

With the plate 32 now in its lowermost position, the block 91 of ice cream, including the upwardly extending sticks, is inserted into the passage 21 between die 14 and counter surface 12 of cabinet 10 and placed on plate 32. The lowermost surface of block 91 is thereby supported on plate 32, and each of the upwardly extending sticks is oriented generally vertically beneath the centers of the sixteen apertures defined by wires 76, 79. With block 91 in such a position, latch 53 is moved outward, thereby releasing lever arm 20 and permitting extended tension spring 47 to pull extension 45 upward, and thereby rotate lever arm 20 about pin 36. The rotation of of lever arm 20 causes plate 32 connected to end 43 by rod 42 to move upward.

The rate of rotation of lever arm 20 and thus the rate at which plate 32 moves upward is controlled by pneumatic arrestor 40 connected to end 35 of lever arm 20. Pneumatic arrestor 40 is a conventional type in which shaft 50 is connected to a piston (not shown) within the arrestor. A hole (not shown) in the exterior of arrestor 40 permits air to escape at a controlled rate as the piston is compressed. Thus even though tension spring 47 connected to extension 45 applies a sudden force to bracket 45 and thus to end 43 of lever arm 20, plate 32 is restrained from upward acceleration by pneumatic arrestor 40.

It should be apparent that pneumatic arrestor 40 and tension spring 47 could be alternated with one another and placed on opposite ends of lever arm 20 without changing the function of lever arm 20. Additionally, arrestor 40 could be of a conventional type having an internal tension spring within it, to thereby eliminate the necessity of spring 47.

The upward movement of plate 32 forces block 91 into contact with the wires 76, 79 of die 14. The heated wires cut the block 91 into the individual serving portions. During the movement of block 91 through die 14, extension 65 remains in contact with electrical switch 69, so that current continues to pass through wires 76, 79. Ultimately the block is fully passed through the wires 76, 79, as depicted by the dotted lines in FIG. 2, thereby resulting in sixteen individual serving portions, each having its own stick. At the uppermost position of plate 32, the wires 76, 79 of die 14 reside in the grooves (not shown) on the upper surface of plate 32, thus allowing the wires to cut through the full depth of ice cream block 91. After plate 32 has reached its uppermost position, extension 65 has moved away from contact with electrical switch 69, thus allowing switch 69 to return to its normally open position. At this point the circuit is open and no current is passing through wires 76, 79.

Referring to FIG. 4, the movement of lever arm 20 in the manner depicted by arrow 110 activates rod 74 connected to counter 70, thereby recording on counter 70 that particular movement of lever arm 20. It is thus possible to record the total number of serving portions formed during a particular time period.

As previously discussed, in the preferred embodiment the wires 76, 79 of die 14 are oriented to permit rectangularly shaped serving portions to be formed, it should be apparent that other shapes and patterns of serving portions may be formed. For example, central wire 79 between sides 24, 26 of die 14 may be removed, and soft ice cream placed into a mold (not shown) having a length generally equal to the length of a conventional half-gallon block. Thus a mold shaped as cylindrical tube may be filled with soft ice cream and, after the ice cream hardens, the tube removed and the cylindrical block oriented with its length horizontal and placed on support plate 32. The modified frame with central wire 79 removed would thus form eight circular disk-shaped individual serving portions.

After the serving portions have been formed in the manner described above, they may be stored for a short period of time prior to sale. The die 14 may be removed for cleaning by pulling it out of slots 28, 30. If after a period of use, wires 76, 79 become stretched, they may be tightened by adjusting screws 91, 93 to compress the springs, such as spring 85, to separate frame halves 87, 89.

As is now apparent, the present invention permits a conventional and readily available half-gallon block of ice cream to be used as the source of individual serving portions. Thus numerous retail outlets for individual ice cream serving portions may be placed in relatively remote locations, since the source of the individual serving portions is readily available at numerous retail and wholesale stores. Additionally, the end product is formed before the eyes of the consumer, thus increasing the appeal of the end product and assuring its freshness.

While the preferred embodiment of the present invention has been illustrated in detail, it should be apparent that modifications and adaptations to that embodiment will occur to those skilled in the art. However, it is to be expressly understood that such modifications and adaptations are within the sphere and scope of the present invention as set forth in the following claims.

What is claimed is:

1. An apparatus for forming, from a block of frozen dairy confection, individual serving portions, the apparatus comprising:
    a die defining a plurality of apertures;
    means for retaining said die in a generally horizontal fixed position;
    means for moving the block through said die;
    a lever arm adapted for rotational movement about an axis between its ends, said lever arm having one end pivotally connected to said block moving means and the other end pivotally connected to said retaining means; and
    means connected to said lever arm for controlling the rate of rotation of said lever arm so as to move said block moving means toward said die, and thereby to move a block through said die whereby the individual serving portions exit the apertures defined by said die.

2. An apparatus according to claim 1 including means for heating said die so as to facilitate the movement of the block through said die.

3. An apparatus according to claim 2 wherein said die further comprises a frame and a plurality of wires mounted to said frame wherein said wires are interconnected so as to form a continuous path for electric current, and wherein said heating means further comprises an electric power supply coupled to said wires, and further including an electric switch coupled to said wires and said power supply, said switch having means operatively connected to said block moving means for sensing the position of said block moving means such that electric current is supplied to said wires by said power supply during a portion of the movement of said block moving means, whereby said wires are heated by the passage of electric current.

4. An apparatus according to claim 3 including means for adjusting the size of said frame so as to tighten said wires.

5. An apparatus according to claim 3 including means for maintaining the tension of said wires relatively constant.

6. An apparatus according to claim 3 wherein said wires are constructed of stainless steel welding wire.

7. An apparatus according to claim 1 wherein said controlling means further comprises a pneumatic arrestor connected to said lever arm.

8. An apparatus according to claim 1 including means operatively connected to said lever arm for counting the number of cyclical movements of said block moving means.

9. An apparatus according to claim 1 adapted for forming individual stick-held portions and including a form for overlying the block prior to the movement of the block through said die, said form further comprising a generally planar surface having a plurality of openings therethrough, each of said openings being arranged on said planar surface so as to overlie a potential individual serving portion on the block, such that sticks may be placed through said openings and into the block prior to the movement of the block through said die, thereby forming individual stick-held portions.

10. An apparatus for forming, from a block of frozen dairy confection, individual serving portions, the apparatus comprising:
    a die defining a plurality of apertures;
    means for retaining said die in a generally fixed position; and
    means for moving the block through said die, wherein said die is retained in a generally horizontal plane by said retaining means, and wherein said die moving means further comprises a plate for supporting the block beneath said horizontally retained die, a lever arm adapted for rotational movement about a substantially horizontal axis between its ends, said lever arm having one end pivotally connected to said plate, means connected to said lever arm for rotating said lever arm so as to move said plate upward, and thereby to move the block through said die, and means for controlling the rate of rotation of said lever arm whereby the individual serving portions exit the apertures defined by said die.

11. An apparatus according to claim 10 wherein said lever arm rotating means further comprises a tension spring having one end fixed and the other end connected to said lever arm.

12. An apparatus according to claim 10 wherein said lever arm rotating means further comprises a tension spring connected to said lever arm proximate one end and wherein said controlling means further comprises a pneumatic arrestor connected to said lever arm proximate the other end.

* * * * *